United States Patent [19]

Tannenbaum et al.

[11] Patent Number: 5,430,841
[45] Date of Patent: Jul. 4, 1995

[54] CONTEXT MANAGEMENT IN A GRAPHICS SYSTEM

[75] Inventors: David C. Tannenbaum; Paul M. Schanely, both of Hurley; Leland D. Richardson, Kingston; Bruce C. Hempel, Tivoli, all of N.Y.

[73] Assignee: International Business Machines Corporation, Armonk, N.Y.

[21] Appl. No.: 968,613

[22] Filed: Oct. 29, 1992

[51] Int. Cl.6 .............................................. G06F 12/00
[52] U.S. Cl. .................................... 395/164; 395/162
[58] Field of Search ............... 395/100, 158, 160, 275, 395/800, 153–157, 162, 164, 650; 345/115, 119, 120, 189, 190

[56] References Cited

U.S. PATENT DOCUMENTS

| | | |
|---|---|---|
| 3,575,555 | 4/1971 | Schanne . |
| 3,588,353 | 6/1971 | Martin . |
| 4,566,117 | 1/1986 | Suckle . |
| 4,658,351 | 4/1987 | Teng ................................. 364/200 |
| 5,097,411 | 3/1992 | Doyle et al. ....................... 395/600 |
| 5,155,822 | 10/1992 | Doyle et al. ....................... 395/400 |
| 5,224,210 | 6/1993 | Pinedo et al. ..................... 395/164 |
| 5,276,798 | 1/1994 | Peaslee et al. .................... 395/162 |
| 5,291,608 | 3/1994 | Flurry ............................... 395/725 |
| 5,329,615 | 7/1994 | Peaslee et al. .................... 395/162 |

FOREIGN PATENT DOCUMENTS 2269765  11/1975  France .

OTHER PUBLICATIONS

*A New VLSI Graphics Coprocessor*—The Intel 82786, 1986 IEEE Computer Graphics and Applications 6, Oct., No. 10, N.Y., USA.

*A Uniform Approach to Represent Features in Different Application Contexts*, Modeling in Computer Graphics, 8286 Computers in Industry, 19(1992) May, No. 2, Amsterdam, NE.

IBM Technical Disclosure Bulletin, vol. 34, No. 7B, Dec. 1991, pp. 29–30.

IBM Technical Disclosure Bulletin, vol. 34, No. 11, Apr. 1992, pp. 433–434.

*IBM Technical Disclosure Bulletin*, vol. 33, No. 7, Dec. 1990, "Improved Dispatching in a Rendering Context Manager", pp. 131–134.

Primary Examiner—Mark R. Powell
Assistant Examiner—U. Chauhan
Attorney, Agent, or Firm—Mark S. Walker

[57] ABSTRACT

A method and apparatus for the management of the data associated with multiple graphics contexts in a computer graphics rendering system. Graphics contexts are built by graphics engines and selectively saved into a context save RAM. Context switches are managed either by modifying a context base pointer to address a new section of the context save RAM, or by writing out a portion of the context save RAM to external storage and reading in a replacement context from external storage. The writing and reading process are managed by a control processor allowing the graphics engines to switch context at the same time. New contexts read from external storage automatically cause regeneration of downstream rasterization parameters.

5 Claims, 6 Drawing Sheets

CONTEXT MANAGEMENT IN A GRAPHICS SYSTEM

BACKGROUND OF THE INVENTION

1. Field of the Invention

The present invention relates in general to methods and apparatus for use in computer graphics systems, and in particular to method and apparatus in a computer graphics system that requires multiple contexts. Still more specifically, the present invention relates to a method and apparatus in which one or more graphics contexts can be accumulated in a central node, read out for context save and written back for context restore, the node handling all operations necessary for the dissemination of context restore information.

2. Background and Related Art

Computer graphics workstations are widely used to generate high quality three-dimensional graphics images and to run application programs with two dimensional displays in a windowed environment. A windowed environment is used to allow a display device to present the output from several applications on a single physical output medium. The output display of an application is typically presented in one or more two dimensional "windows" in the windowed environment. A unique context may be associated with each window to define the properties and parameters of that window. Although there need not be a one-to-one correspondence between contexts and windows, such a correspondence is common. Increasingly, computer graphics systems are supporting multiple contexts. For example, a graphics system may have in one window a high quality rendering of a machine part being developed. In another window there may be an interactive dialog in which the designer can change the properties of the machine part or make inquiries about it. In yet another window there may be a clock, and in still another window an inter-office mail application may be running. An example of a multiple window session is illustrated in FIG. 1. The X Window System developed by M.I.T. is an example of a well-known windowing system standard.

The current invention relates to the management of the graphics data associated with multiple contexts, that is, the data associated with a graphics system that supports multiple windows. As used herein, "context" refers to the data used by a graphics system to control the rendering process, i.e., the process through which a displayable image is generated.

The context in a computer graphics system such as those in which the present invention is embodied consists of two portions, a first portion used by the front end geometry processor subsystem, and a second portion used by the rasterization subsystem.

During normal drawing operation, the front end geometry processor subsystem accepts graphic drawing orders and sends information to the rasterization subsystem indicating various attributes of the drawing environment including current color, line style patterns, window offset, and so on. The "current context" state consists of all the information needed by the geometry subsystem (first portion), and the rasterization subsystem (second portion) to render displayable objects in a defined window. The present invention deals with the maintenance of the second portion of the context, the portion specific to the rasterization subsystem.

In a graphics system in which multiple contexts must be supported, and quickly switched among, there is a large amount of data that must be saved and restored each time the context is swapped. In the past, rather than saving the said second portion of context currently in effect for later restoration, it was discarded and every new context required complete regeneration, that is, it required reinterpretation of context to produce rasterization subsystem commands.

The short-coming with this prior art approach is that it requires all data of the context used by the rasterization subsystem to be restored through the top of the pipeline, thus requiring processing. Graphics systems typically employ a number of connected processors to form a processor pipeline. The first processors in the pipeline (at the "top") frequently manage the work of the lower level processors by interpreting and dispatching tasks to these processors. Because the data used by the rasterization subsystem is generally in a different format than the data at the top of the pipeline, a large amount of pipeline processor time must be spent to transform the data into the appropriate format for use by the rasterization subsystem. During this time the front end subsystem cannot be restoring the portion of the context relevant to its own processing. Furthermore, delay associated with the latency time of the graphics pipeline is incurred when restoring a context via the pipeline.

SUMMARY OF THE INVENTION

It is therefore one objective of the present invention to provide methods and apparatus for managing the data associated with multiple graphics contexts in a computer graphics system.

It is another objective of the present invention to provide methods and apparatus for managing the data associated with multiple graphics contexts in a computer graphics system in which the data is saved in a special context save RAM located within the graphics system.

It is yet another objective of the present invention to provide methods and apparatus for managing the data associated with multiple graphics contexts in a computer graphics system that further provides means for the selective saving and restoring of graphics context data.

It is yet another objective of the present invention to provide methods and apparatus for managing the data associated with multiple graphics contexts in a computer graphics system in which the graphics contexts are the result of multiple geometry engines' data output and in which the graphics context can be automatically regenerated for down-stream raster engines.

The foregoing objectives are achieved as is now described.

The present invention proposes a means for saving the current state of the graphics machine (specifically, the said second portion of the context) as it is formed over time by the sending of commands by the front end geometry subsystem to the rasterization subsystem such that this information can be read out directly via a direct memory access (DMA) transfer into a memory area.

Upon a context switch, a control processor may read the current state of the raster engine (the context to be saved) as a DMA transfer to a memory save area. Simultaneously, the processor(s) in the front end geometry subsystem may save their state to a memory area.

Upon completion of reading the state of the raster engine, a new state (the raster context to be restored) may be sent directly to the rasterization subsystem. The new context data is sent via a DMA rather than through the rendering pipeline. In parallel, the front end processor(s) may load the new geometry context.

The previous paragraph described a hard context switch, one in which context data was read and written from and to the rasterization subsystem. Another context management operation is possible, the soft context switch. This is used when both the context swapped out and the context swapped in are both resident in the rasterization subsystem, and all that is done to effect the swap is a change in a base register. Soft context swaps may be used when the total amount of context data to be managed can be maintained within the rasterization subsystem, as will be described in the detailed preferred embodiment.

The data read from and written to the rasterization subsystem is in the same format and thus processing by the front end geometry subsystem is not required. In the preferred embodiment context management for the rasterization subsystem does not require any intervention or processing by the front end geometry subsystem because the DMA operations are initiated by a control processor.

FEATURES OF THE INVENTION

The current invention permits the entire rasterization subsystem context to be read (saved) and written (another context initiated) in a single DMA operation. Thus the context swap requires minimal CPU intervention to initiate a pair of DMA transfers. Furthermore, with the command opcode map provided, only those commands deemed relevant for context save/restore need actually be read out and subsequently restored. Commands that are not unique for each context and which need only be set once upon initialization of the rasterization subsystem can be skipped in the context save/restore operation thereby saving context RAM space and DMA processing time.

It should be noted that the context save RAM can also hold data which is not part of the context as used by the rasterization subsystem but instead consists of data needed for a context. This provides a mechanism of utilizing the context save RAM as a "mailbox". For example, the GL application program interface defines the concept of a current raster position. This data is maintained as part of the context although it is not explicitly used by the raster subsystem. Instead, it is used by the front end geometry subsystem to properly position subsequent drawing primitives sent to the rasterization subsystem and also to respond to inquiries for the current position posed by the application program.

Additionally, the ability to read a context as accumulated in the rasterization subsystem provides a powerful debugging and diagnostic aid. It is possible to read out the exact current state of the rasterization subsystem when a problem is found without having to try to deduce the state by looking at the past stream of commands received.

BRIEF DESCRIPTION OF THE DRAWINGS

The novel aspects believed characteristic of the current invention are set forth in the appended claims. The invention itself, however, as well as the preferred embodiment therein, and further advantages thereof, is best understood when the following detailed description is read in conjunction with the accompanying drawings, wherein:

Figure 1:
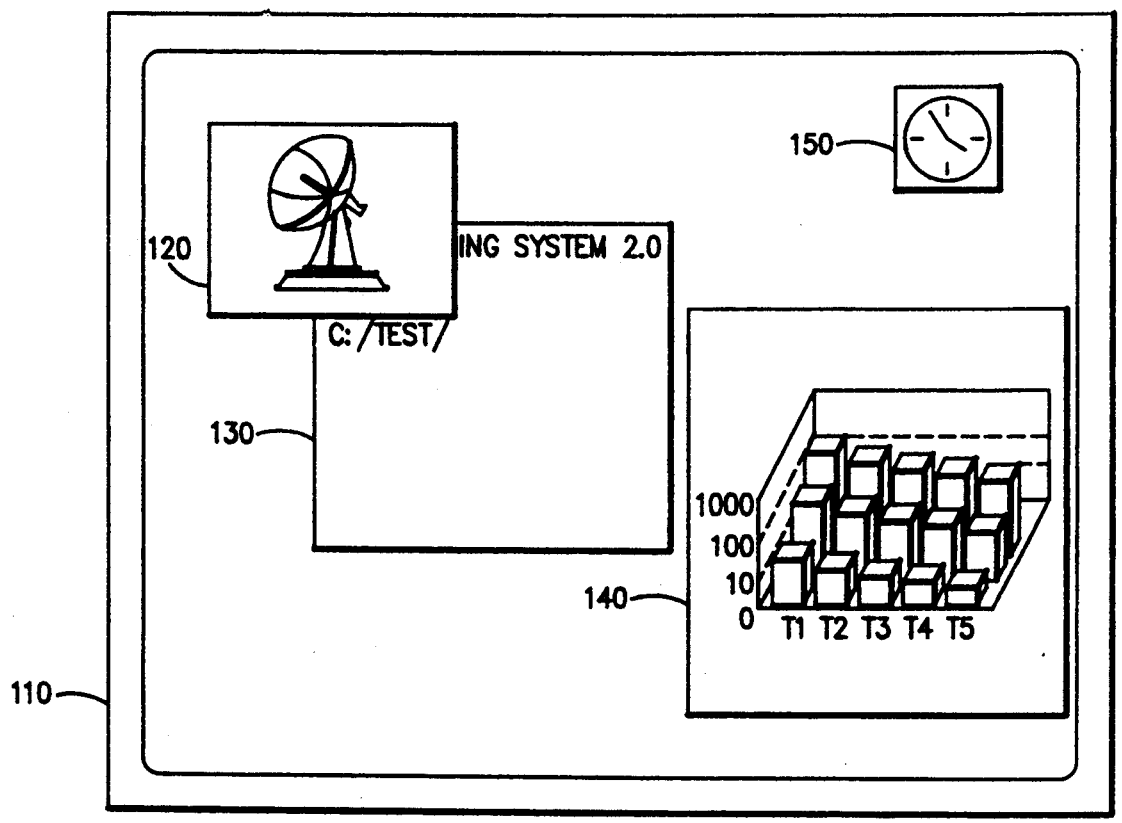
FIG. 1 is an illustration of a multiple window system as apparent from the front-of-screen.

The reference numbers attached to items in the drawing are consistent among the drawings. For example, 230 refers to the rasterization subsystem throughout.

DETAILED DESCRIPTION

With reference to the figures, and in particular with reference to FIG. 1, there is depicted a multiple window system as might be seen at front-of-screen in a graphics system. Screen 110 contains multiple simultaneously displayed windows 120, 130, 140, and 150. These windows may contain a variety of data and may represent different applications running in the computer system. Window 120 in the example contains a complex three-dimensional application, while window 140 contains a graphing application. In window 130 there is a text dialog. Window 150 contains a clock. Screen 110 is divided into a number of pixels addressed by the relative X and Y location. In the preferred embodiment, the screen contains 1280 pixels horizontally and 1024 pixels vertically. The color and intensity of each pixel is controlled by the graphics processor.

The current invention relates to the management of the rasterization subsystem contexts associated with a plurality of windows.

Figure 2:
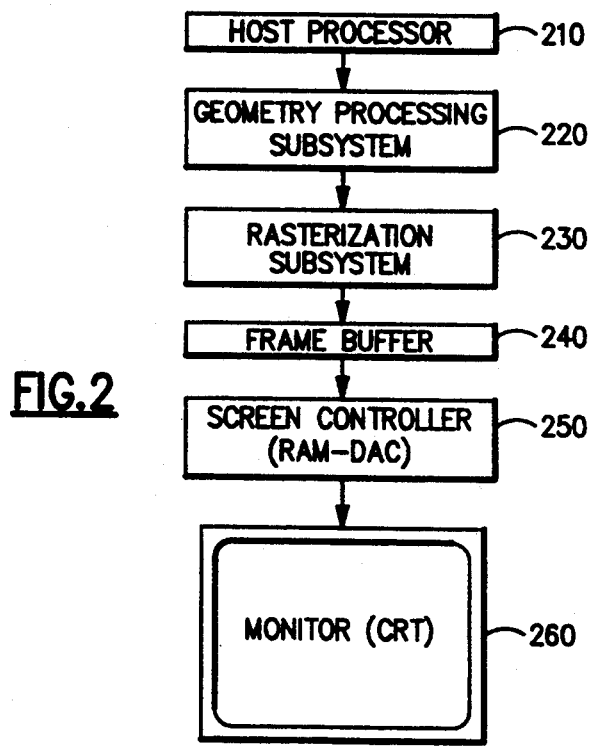
FIG. 2 simplified diagram of the invention according to a preferred embodiment.

FIG. 2 shows schematically a graphics system in which the present invention may be embodied. This system is illustrative only and other graphics systems may be used. Geometry processing subsystem 220 is responsive to geometric data including geometric drawing primitives and data located in an X, Y, Z coordinate system as well as color data received from host processor 210 and applies transformations to that data. Host processor 210 may be any computer engine that is capable of supplying data to the graphics adapter, for example, a RISC System/6000. (RISC System/6000 is a trademark of IBM Corp.). Geometry processing subsystem 220 creates a modified data stream of vertices sent to rasterization subsystem 230. Rasterization subsystem 230 is responsive to the vertex data (position, color, and other attributes) and generates values for the appropriate pixels in a process known as rendering. For example, two vertices define a line, and rasterization subsystem 230 generates (renders) the pixels that lie between the vertices. This process transforms a graphics order into a displayable pixel image. Rasterization subsystem 230 stores the rendered pixel data in frame buffer 240. Frame buffer 240 is connected to screen controller 250 which is responsive to the pixel data scanned out of frame buffer 240. CRT monitor 260 is connected to screen controller 250. Although a frame buffer, screen controller and CRT monitor have been depicted as present in the preferred embodiment, this is for illustrative purposes and should not be construed as requirements for the embodiment of the current invention.

Figure 3:
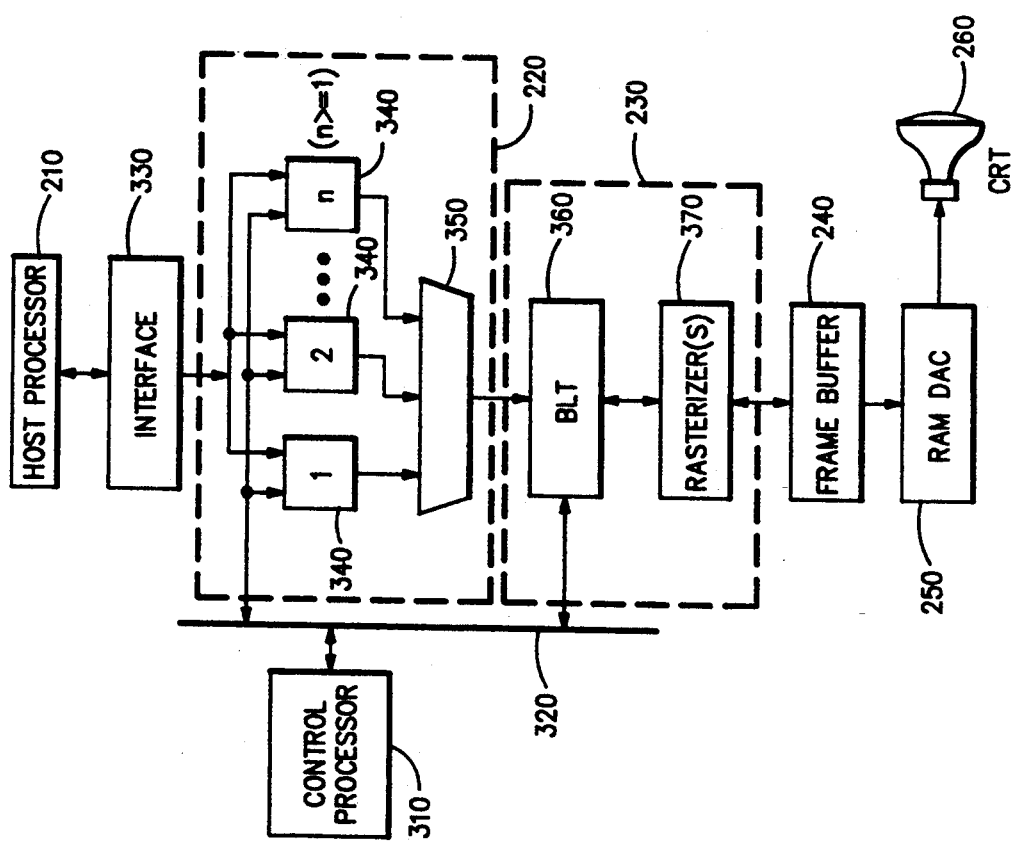
FIG. 3 a more detailed diagram of the system of FIG. 2. The preferred embodiment has the context save RAM located in the BLT unit shown in the center of the diagram.

Referring now to FIG. 3, there is depicted a more detailed representation of a computer graphics system in accordance with a preferred embodiment therein. Front end geometry subsystem 220 is connected to host processor 210 via interface unit 330. Front end geometry subsystem processors 340 (one or more of them) are connected to BLT unit 360 by means of multiplexor unit 350. The exact nature of multiplexor unit 350 is not relevant to the current invention. It will be understood by those skilled in the art that all that is required is means for merging one or more processors' data onto a common bus.

Continuing in FIG. 3, BLT unit 360 in accordance with a preferred embodiment of the current invention handles preprocessing of bit block transfer commands and is connected bidirectionally to rasterizer 370. Rasterizer 370 may, in accordance with a preferred embodiment, consist of one or more rasterizer units. Rasterizer 370 is bidirectionally connected to frame-buffer 240 which also drives random access memory digital-to-analog converter (RAM DAC) 250 which produces analog signals for cathode ray tube (CRT) 260. It will be understood by those skilled in the art that the nature of elements 370, 240, 250, and 260 is of no direct relevance to the present invention and variations on their form are contemplated to exist within the spirit and scope of this specification. Control processor 310 acts as a control mechanism for the system to provide system services such as context save and restore. Control processor 310 communicates with the rest of the system by means of bus 320. Control processor 310 is a generic processor means, one not unique or specific to the tasks it is assigned in the preferred embodiment. Control processor 310 consists of a processor and some amount of local processor storage means. It will be understood that control processor 310 and the geometry subsystem 220 need not be physically separate and may be performed by one or more processors.

Figure 4A:
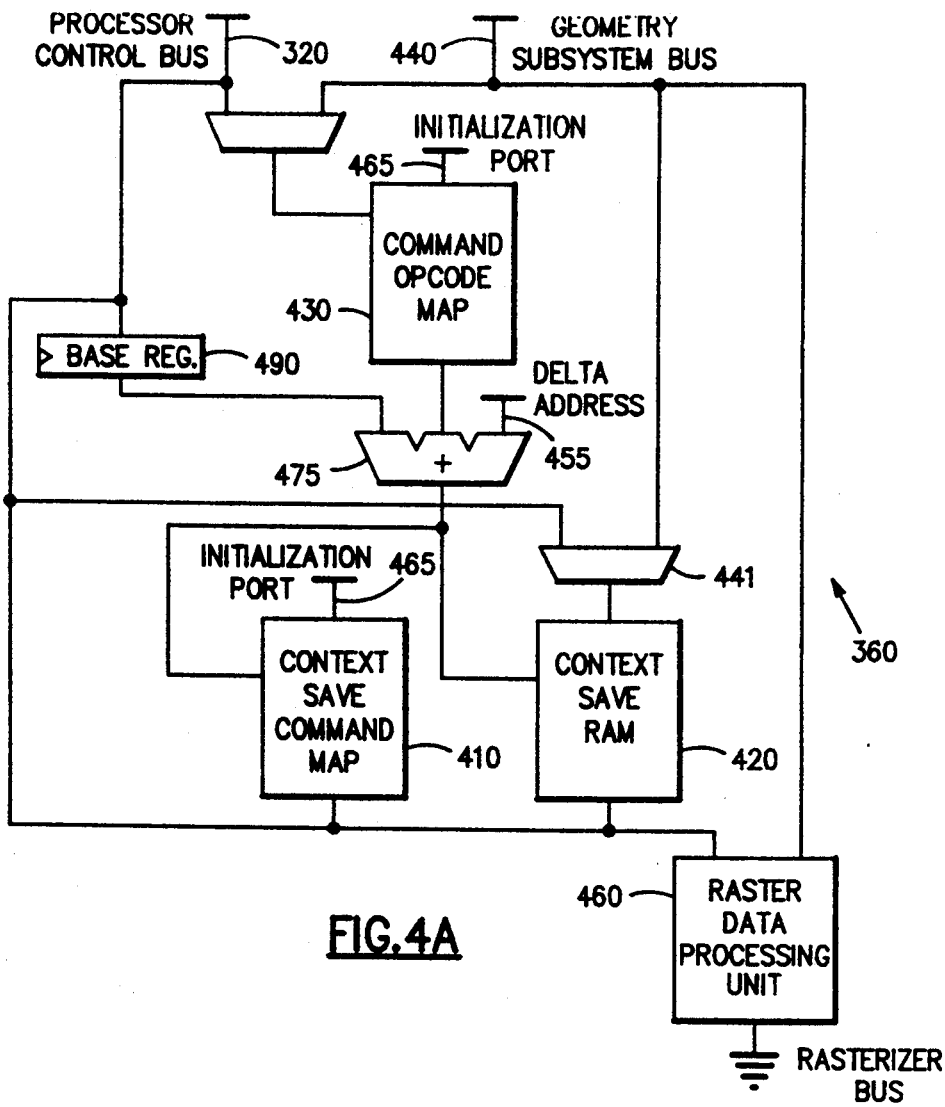
FIG. 4a is a high-level block diagram of the entire BLT unit function.

Referring now to FIG. 4a, there is depicted a preferred embodiment of the current invention as it exists within the BLT unit 360. In this figure, in accordance with a preferred embodiment, boxes 410, 420, and 430 are each random access memories graphically depicted such that the read/write address is supplied from the left, the write data is supplied to the top, and the read data is read from the bottom. Command opcode map 430 can be initialized via initialization port 465 via which externally stored data is supplied. Contact save RAM 420 is addressed by either the control processor bus 320 or the geometry subsystem bus 440 as selected by multiplexor 441. The control processor bus 320 is used when a context is being read in or out of the context save RAM 420 as will be discussed below. The geometry subsystem bus 440 is used during the accumulation of a context.

Base register 490 is loaded by the control processor using control processor bus 320. This register provides a base address for indexing into context save RAM 420 and context save command map 410 through the three-ported adder 475. Delta address 455 is provided as input to the adder 475 to facilitate the addressing of multiple data-word commands saved as part of the context into context save RAM 420. Context save command map 410 is initialized by initialization port 465 and, as mentioned, addressed by adder 475. The command opcode address is supplied to adder 475 from command opcode map 430.

Context save command map 410 is used during context restore operations to insert the command opcode that corresponds to a given piece of data stored in the context save RAM 420. For example, during a context restore operation, if location n in the context save RAM 420 is loaded by a DMA operation, then the opcode corresponding to this piece of data is saved in location n of the context save command map 410. During the context restore operation, when location n is updated by the DMA, the corresponding command is read from context save command map 410 and written to raster data processing unit 460 from which it is sent to the down stream raster engine(s). Also during the context restore operation, the data written to context save RAM 420 is sent to raster data processing unit 460 to provide the data for the command sent from context save command map 410.

To further describe context save command map 410, it provides a mapping between the command opcode received by the BLT unit 360 and the opcode subsequently passed to raster data processing unit 460 and from there to the down-stream rasterizers. The context save command map 410 provides flexibility in that opcodes can be redefined upstream and mapped into their corresponding down-stream values. Again, this can be used to limit the total amount of data that must be stored in the context save RAM 420. Additionally, this reduces the need to make expensive hardware modifications to correct for potential opcode collisions in which two or more functions are mistakenly assigned the same opcode.

The exact nature of raster data processing unit 460 is not relevant to the current invention. It can be any apparatus deemed necessary as part of the pixel processing in a raster graphics system. Variations to 460 are contemplated as being covered by the spirit of this specification.

Context save command map 410 and context save RAM 420 of the preferred embodiment each has 256 entries and command opcode map 430 has 512 entries. However, as will be apparent to anyone skilled in the art, the exact dimensions of the maps 430 and 410 and RAM 420 are not fixed. They may be of any appropriate size for a given system and variations therein are considered readily apparent extensions of the current invention.

A recommended power-up state for the command opcode map 430 exists in accordance with a preferred embodiment of the current invention.

Figure 4B:
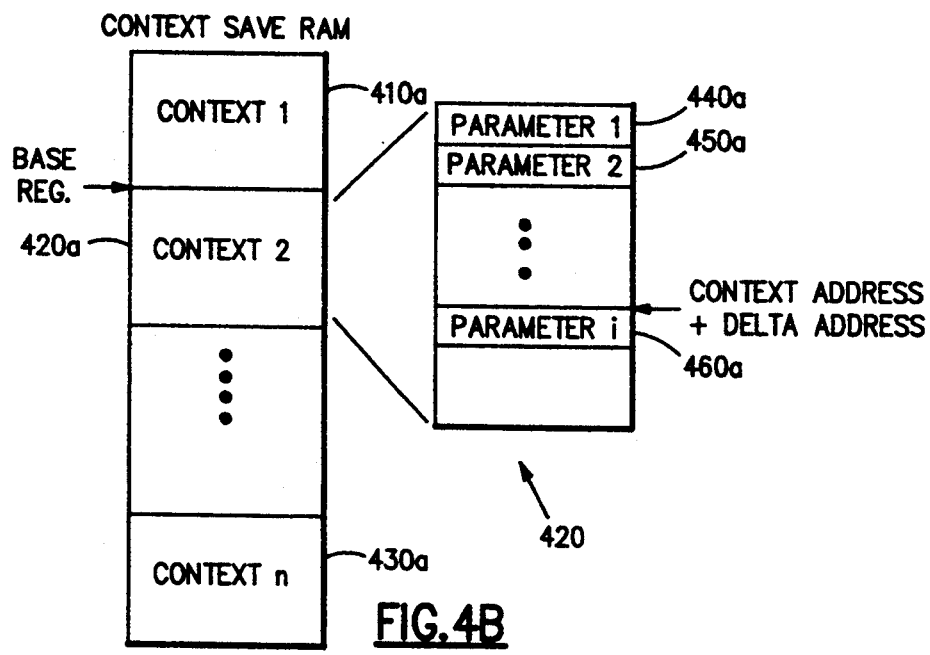
FIG. 4b is a blow-up of the context save RAM.

Referring now to FIG. 4b, there is depicted an expanded view of the context save RAM 420. Context save RAM 420 can be logically partitioned into n separate regions $410a, 420a, \ldots, 430a$. A given region of the context RAM 420 is selected (that is, indexed into) by base register 490. Region $420a$ is shown expanded to reveal its constituent data. Region $420a$ is the aggregate of a set of context data $440a, 450a, \ldots, 460a$. A specific entry in the context save RAM 420 is accessed by adding the value of the base register 490 to the context RAM address as supplied by command opcode map 430 and further adding in the delta address 455. The delta address is used to select among the various pieces of data which may be present in a given command. For example, in the preferred embodiment, a command specifying a bit block transfer (BITBLT) contains multiple data words, the source X, source Y, destination X, destination Y, width, and height, etc. When this command is encountered, if the command opcode map 430 indicates the command is to be saved in context save RAM 420 then delta address 455 is stepped once for each piece of data associated with the BITBLT command to address the proper location in context save RAM 420.

Figure 5:
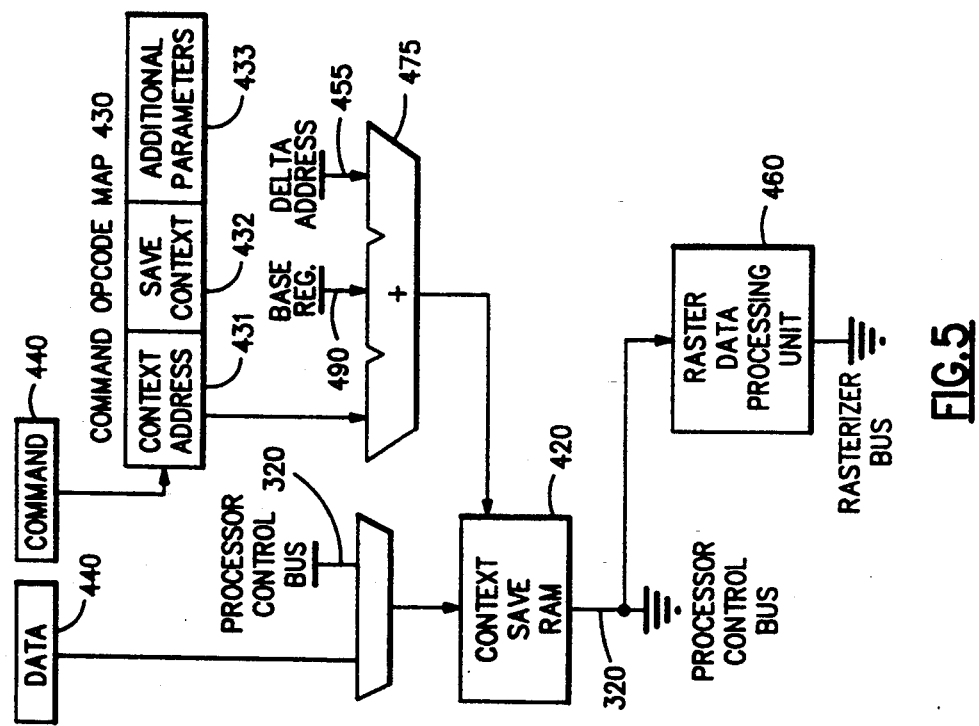
FIG. 5 shows in detail the context save/restore logic and RAM in the BLT unit.

Referring now to FIG. 5, there is depicted a more detailed diagram of a portion of the context save logic in the BLT 360 in accordance with a preferred embodiment of the present invention. One entry in command opcode map RAM 430 is shown. Command opcode map 430 is responsive to command information 440 received from the front end geometry subsystem. Each entry of command opcode RAM 430 consists of three distinct sections. The first is the context address 431 which is used to address where within a region of the context save RAM 420 a particular context creating command is to be saved. The second field is a Boolean flag, save context 432, which indicates whether the particular command is to be saved. If this flag is not set, then, in the preferred embodiment, the first field is not used and the command is not saved in the context save RAM. The third field, additional parameters 433, represents any additional data that may be associated with the processing of a command. In the preferred embodiment the additional parameters field 433 includes a multiple data flag (not explicitly shown in the drawings) which is set to indicate that a command contains multiple data words, as for example, the aforementioned BITBLT command. This flag is used to trigger the use of the delta address 455. Alternate embodiments of the second field 432 and third field 433 are contemplated. For example, the Boolean flag 432 and multiple data flag (portion of field 433) can be supplied as part of the command data stream supplied to BLT unit 360. The context address 431, base register 490 and delta address 455 are summed by means of three-ported adder 475. Adder 475 can be implemented by any known means and its exact formulation is not considered relevant to the current invention. Adder 475 provides the address signal to context save RAM 420. Context save RAM 420 receives data input from the front end geometry subsystem as shown represented by block 440 or from control processor 310 by means of control processor bus 320. The read port of context save RAM 420 is connected by a multiplexor to control processor bus 320 for use during hard context save operations, and to raster data processing unit 460 for context restore operations.

Again considering command opcode map 430, the ability to selectively control which commands are to be saved in context save RAM 420 and at what location within context save RAM 420 they are to be saved is an improvement over the prior art because only commands relevant to a context need to be saved and also, related commands can be saved in contiguous locations to facilitate partial context swaps. Furthermore, the data associated with different commands may be saved at the same locations within the context save RAM 420. For example, the source X and source Y parameters associated with different types of BITBLT commands may be saved at the same locations in context save RAM 420. This has the effect of reducing the data that must be transferred by DMA during a hard context swap. Also, by only saving relevant commands, more contexts can be saved in the context save RAM 420 before a hard context save is required.

Figure 6:
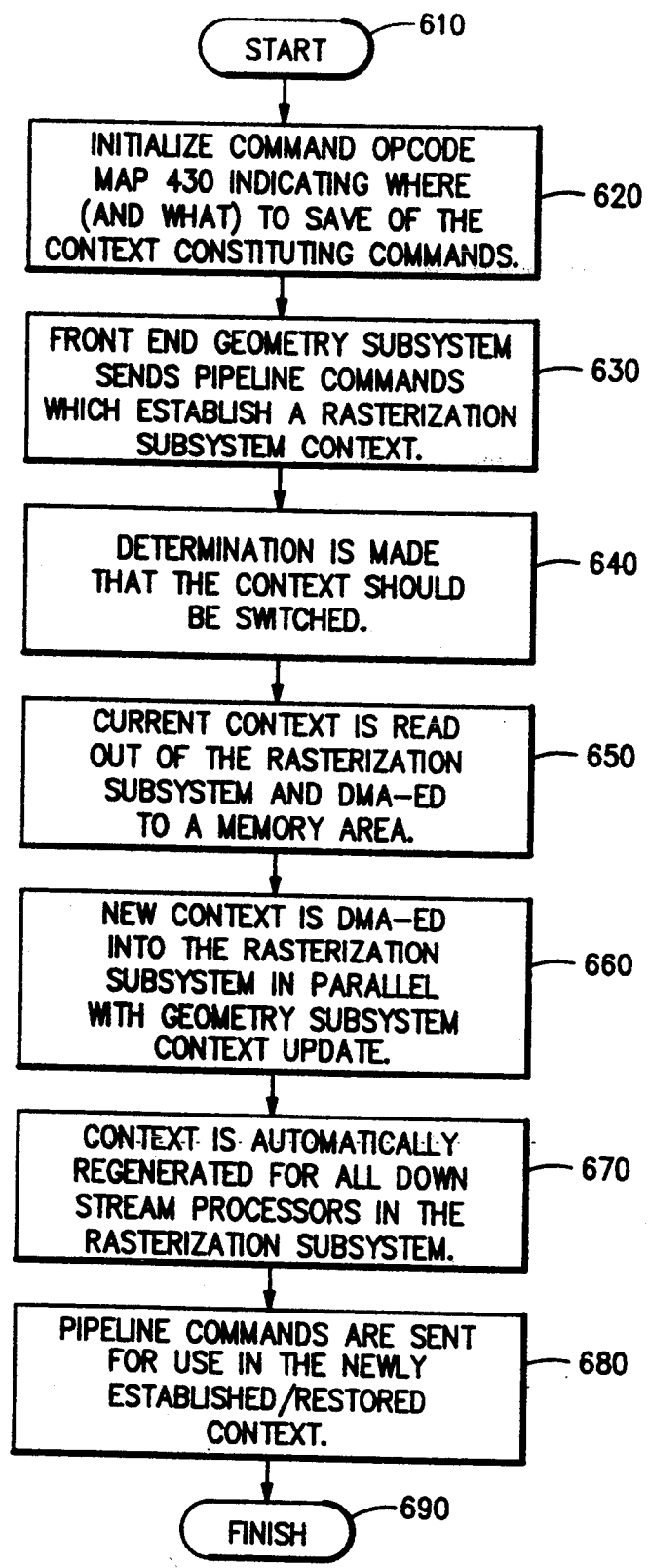
FIG. 6 depicts a high-level logical flow chart for performing a context save/restore operation in accordance with a preferred embodiment of the current invention.

Referring next to FIG. 6, there is diagrammed a logical flow chart for the context save and restore operations according to the present invention described at a high level. The process begins in block 610 and thereafter proceeds to block 620, initializing the command opcode map 430. Afterward, in block 630 the front end geometry subsystem sends commands, which when taken in aggregate, constitute the rasterization subsystem context.

Block 640 is a determination that a context switch is requested. At this time block 650 reads the current context from the rasterization subsystem. Afterward, block 660 establishes the new context. Afterward, block 670 triggers automatic regeneration of downstream commands. Next, block 680 resumes the sending of graphics commands by the front end geometry subsystem. The process is terminated in block 690.

Figure 7:
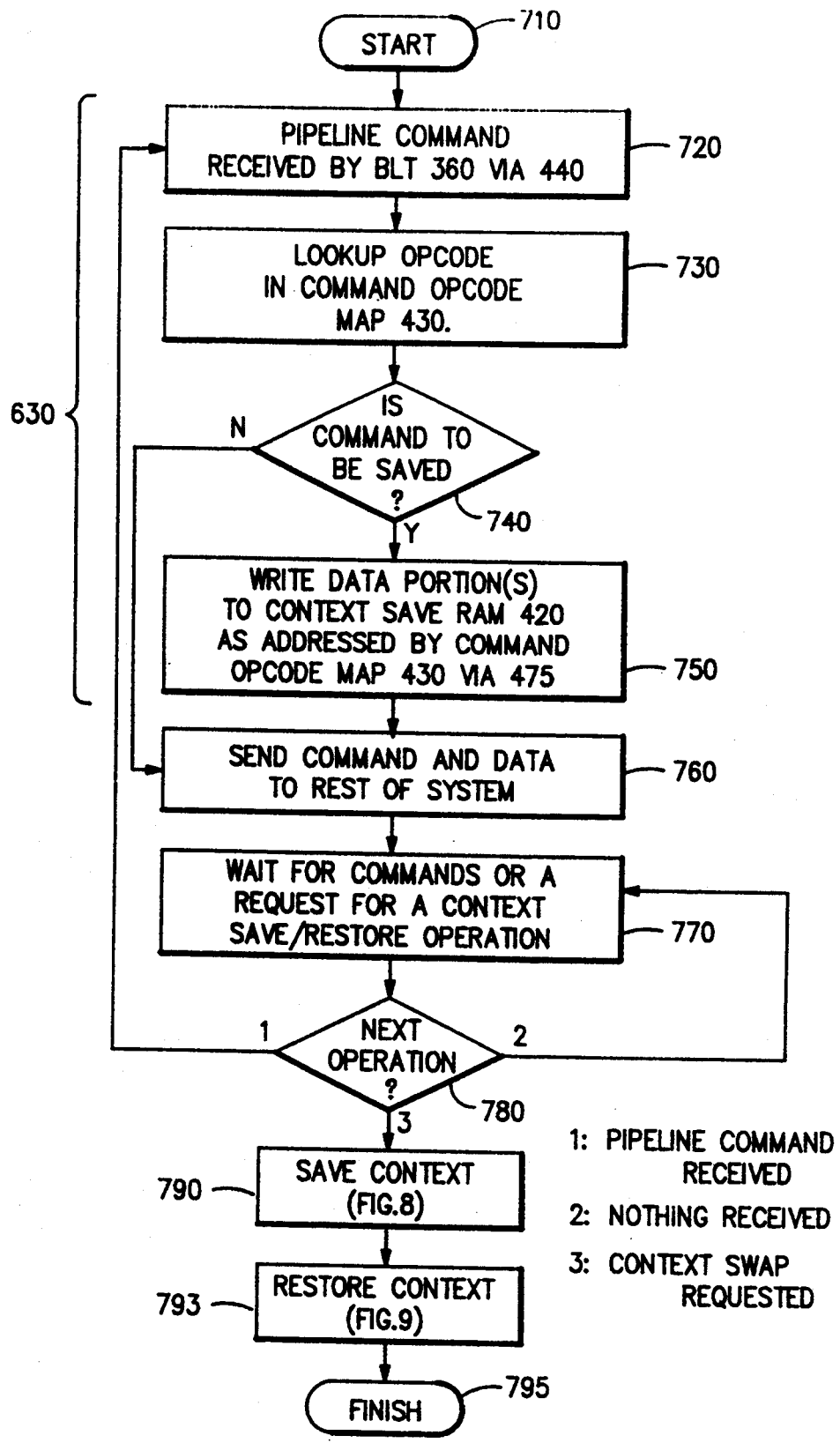
FIG. 7 depicts a logical flow chart detailing the accumulation of a context.

Referring now to FIG. 7, there is diagrammed a logical flow chart detailing the accumulation of a context. The process begins in block 710. Block 720 depicts the reception of a pipeline command by the BLT unit 360 via geometry subsystem bus 440. Block 730 depicts a lookup of the pipeline command's opcode in the command opcode map 430. Decision block 740 determines whether the received command is a command to be saved in the context save RAM 420. The determination is made by inspecting the Boolean flag save context 432. If set, then the process proceeds to block 750 writing the command's data to the context save RAM 420 to be accumulated as a part of the context. In block 760 the command and its associated data are sent to the downstream portion of the system consisting of raster data processing unit 460 and the rasterizer(s) 370. Next, block 770 depicts waiting for the next work item. After each cycle the BLT awaits work. Decision block 780 determines whether new work is present. If none exists, the BLT unit continues waiting by returning to block 770. If another pipeline command is received, then path 1 is taken and processing returns to block 720. If a request for a context swap is received, then path 3 is taken and block 790 performs a context save operation (as diagrammed in FIG. 8). The process continues with block 793 performing a context restore operation (as diagrammed in FIG. 9). The process terminates in block 795.

Figure 8:
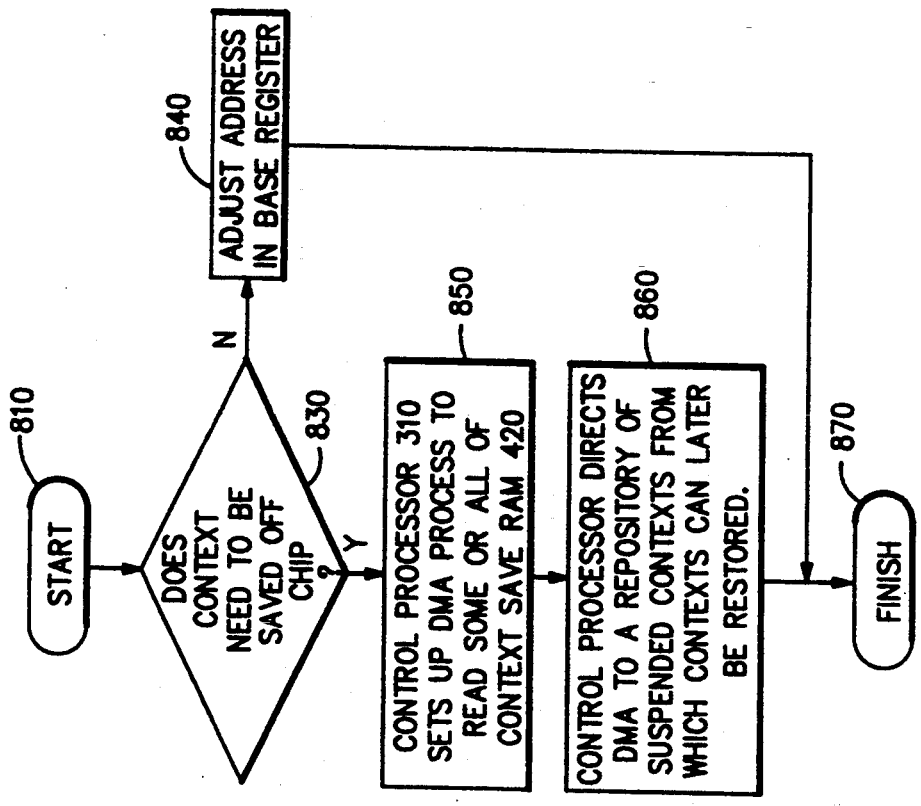
FIG. 8 depicts a logical flow chart detailing the saving of a context.

Referring now to FIG. 8, there is diagrammed a logical flow chart detailing the context save operation according to the present invention. The process begins in block 810 and thereafter proceeds to block 830 which determines whether the context needs to be saved from the BLT unit 360.

Two types of context save are contemplated in the current invention. A hard context save is used when context must be read from the BLT unit 360 and saved in some external (for example, off chip) storage means. This is used when there are more contexts to manage than there is internal storage available in the context save RAM 420. This determination is made based on the size of the context save RAM 420 and on the number of commands constituting the context to be saved. A soft context swap is used when the contexts being managed are contained within the context save RAM 420. When a hard context save operation is required, any algorithm can be used to select the region to be saved using DMA processing. For example, the least recently used region can be selected. In a soft context save, no memory data is DMAed from the context save RAM 420. Instead, the base register 490 is adjusted to point to a new region of the context save RAM 420.

Continuing at decision block 830 of FIG. 8, if the determination is no, the process moves to block 840 which changes the base register, after which, the process terminates at block 870. If the determination is yes, block 850 initiates a control processor 310 read of the context save RAM 420. This read is via a DMA transfer in accordance with a preferred embodiment of the present invention though other memory I/O methods could be employed. Afterwards, block 860 the control processor directs the data read from the context save RAM 420 to a central repository of suspended contexts. In the preferred embodiment this central repository may be local memory available to control processor 310. The process then terminates in block 870.

Figure 9:
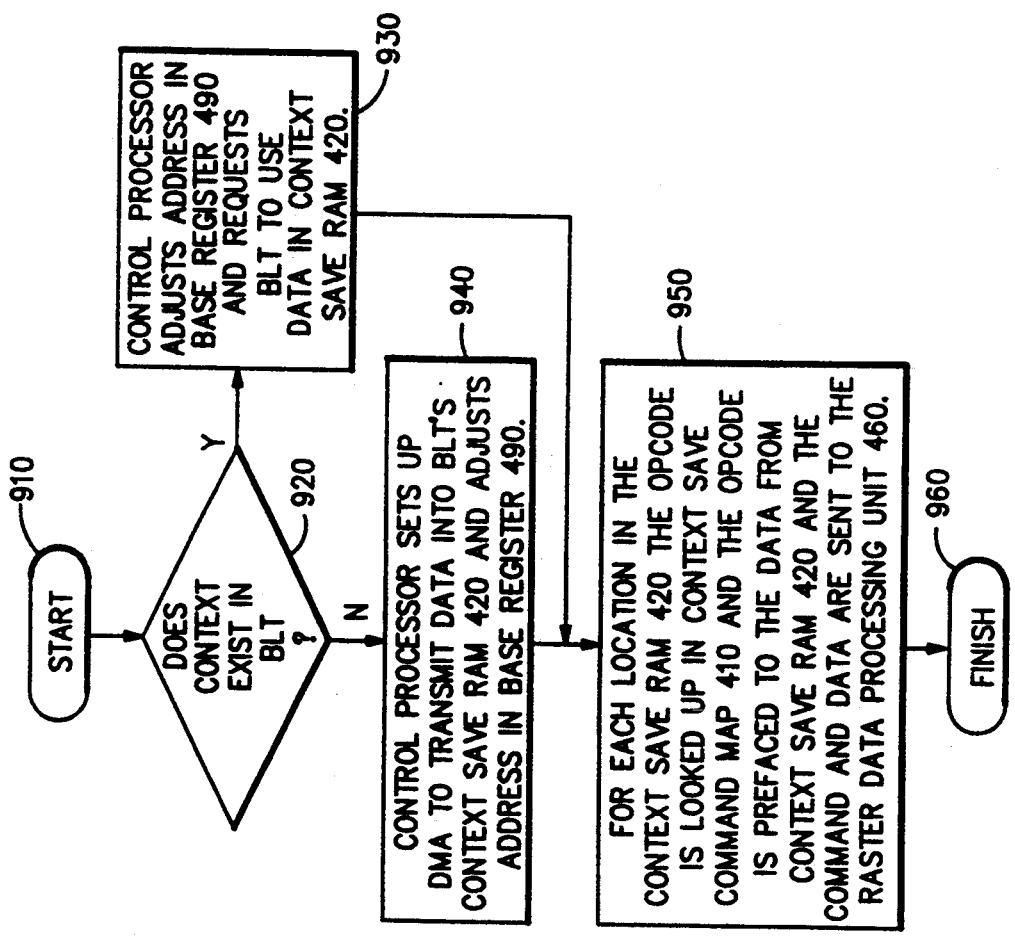
FIG. 9 depicts a logical flow chart detailing the restoring of a context.

FIG. 9 is a diagram of a logical flow chart detailing the context restore operation according to the present invention. The process begins in block 910 and thereafter proceeds to block 920 which determines whether the context to be restored is resident in the context save RAM 420. If the determination is yes, (that is, a soft context restore is called for) then block 930 adjusts the base pointer and requests use of the context save RAM 420 as it currently exists in the BLT unit 360. The size of the context to be restored can be remembered in either control processor 310 storage, or can be saved in an extension to base register 490 or other storage means. Maintaining a separate size for each context improves the flexibility of the context management means provided by the current invention.

Continuing with FIG. 9, if the determination is no, (that is, a hard context restore is required) then block 940 initiates a control processor 310 write of the context save RAM 420. This write is via a DMA transfer in accordance with a preferred embodiment of the present invention. Afterwards, block 950 regenerates the downstream context from the context save RAM 420 as controlled by the command opcode map 430. The process then terminates in block 960.

What is claimed is:

1. A system for managing graphics system rendering context data in a graphics system having a geometry processor and a control processor, said geometry processor creating said graphics system rendering context data by processing a plurality of graphics orders, said graphics system rendering context data used by a rasterizer to generate displayable pixel data, said system comprising:
    first data storage means for storing said graphics system rendering context data;
    control means for detecting a graphics system rendering context data swap requirement;
    memory input/output means for copying said graphics system rendering context data in said first data storage means to a second storage means and for copying new graphics system rendering context data from said second storage means to said first data storage means without processing graphics orders; and
    selection means for selecting a subset of said graphics system rendering context data for storage by said first data storage means.

2. The system of claim 1, wherein said first data storage means comprises:
    addressing means for determining a rendering context item address in said first data storage means;
    random access storage means for storing said graphics system rendering context data, said random access storage means being responsive to said addressing means; and
    storage map means for generating graphics context operation code data, said storage map means being responsive to said addressing means.

3. The system of claim 2 further comprising operation code storage means and wherein said means for selecting includes:
    means for testing said operation code storage means to determine whether a graphics order is required to be stored; and
    means for generating an address for said first data storage means based on a location of said graphics order in said operation code storage means, said means for generating providing said address to said addressing means.

4. A method for managing a graphics rendering context in a graphics system having a plurality of processors performing geometry processing and control functions, wherein said graphics rendering context is created by geometry processing a plurality of graphics orders, said method comprising the steps of:
    receiving a next requested operation from one of said plurality of processors;
    testing said operation to determine whether or not a context switch is required; and
    if a context switch is required,
        copying said graphics rendering context to an external storage means; and
        copying a new graphics rendering context from said external storage.

5. A method of managing rendering contexts in a graphics system having a plurality of geometry front end processors for processing a plurality of graphics orders including generation of a rendering context, external and internal storage means, and a control processor for processing non-graphic order commands, the method comprising the steps of:
    receiving a next piece of work;
    testing whether said next piece of work requests a context switch from a current rendering context to a new rendering context;
    if a context switch is requested, determining whether said new rendering context is within said internal storage means and, if so, changing a context reference address to reference said new rendering context;
    if a context switch is requested, but said new rendering context is not within said internal storage means, writing said current rendering context to said external storage means and reading said new rendering context from said external storage means into said internal storage means;
    if said next piece of work is a graphics command, testing whether said graphics command is to be saved in said internal storage means;
    building an index address at which to store said graphics command in said internal storage means; and
    storing said graphics command at said index address.

* * * * *